March 31, 1970     J. B. HAWKSWORTH     3,504,359

POSITION-INPUT ENCODERS

Filed May 10, 1966     5 Sheets-Sheet 1

Inventor
Joseph Bryan Hawksworth
By H R Ritter
Attorney

March 31, 1970  J. B. HAWKSWORTH  3,504,359
POSITION-INPUT ENCODERS

Filed May 10, 1966  5 Sheets-Sheet 2

Inventor
Joseph Bryan Hawksworth
By H R Ratter
Attorney

Inventor
Joseph Bryan Hawksworth
By H R Rather
Attorney

March 31, 1970  J. B. HAWKSWORTH  3,504,359
POSITION-INPUT ENCODERS
Filed May 10, 1966  5 Sheets-Sheet 5

Inventor
Joseph Bryan Hawksworth
By H R Ratter
Attorney

United States Patent Office 3,504,359
Patented Mar. 31, 1970

3,504,359
POSITION-INPUT ENCODERS
Joseph Bryan Hawksworth, Staffordshire, England, assignor to Cutler-Hammer, Inc., Milwaukee, Wis.
Filed May 10, 1966, Ser. No. 548,895
Claims priority, application Great Britain, May 13, 1965, 20,303/65
Int. Cl. G08c 9/00, 11/00; H04l 3/00
U.S. Cl. 340—347
1 Claim This invention relates to an encoder or "digitiser" for converting the movement of an input member such as a disc or plate having a rotary or linear movement into digital signals.

According to the invention, an encoder has a number of detector coils arranged to cooperate with a conductor supported on the input member and arranged so that the electro-magnetic coupling between each conductor and each cooperating detector coil changes at intervals during the movement of the input member. The conductor may be wound, electrolytically deposited or otherwise mounted on the input member. There are many possible ways of arranging the conductor in the form of a pattern so as to induce digital signals dependent upon the position of the input member. In one simple arrangement the conductor is arranged in the form of a square wave extending in the direction of movement of the input member and cooperating with a coil arranged so that successive waves of the conductor pass across one pole of the pick off coil as the input member moves. By feeding a high-frequency alternating current to the conductor, an alternating-current voltage is induced in the pick off coil which is phase-reversed as successive sides of the square wave pass across the pole of the coil. In another arrangement, the pick off coil is a U-shaped electro-magnet having opposite poles arranged to cooperate with a conductor forming two square waves which cooperate with the two poles of the pick off coil. In all cases, the pick-off coil is provided with a suitable magnetic core to intensify the effect obtained.

The required digital signals can most conveniently be obtained from the pick-off coils by means of phase-sensitive rectifiers, the D.C. outputs of which change between two levels as the input member is moved.

Figure 1A:
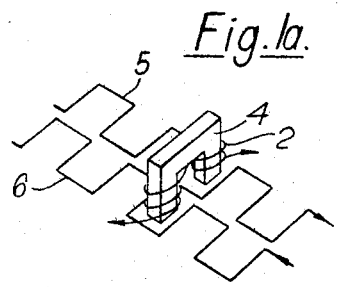
Figure 1B:
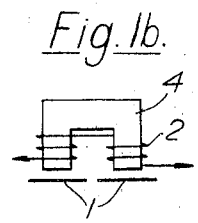
Figure 1C:
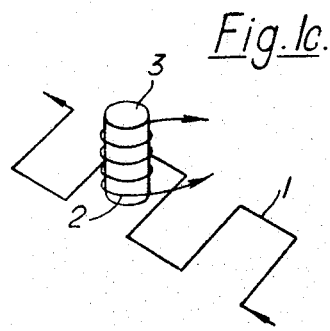
Figure 1D:
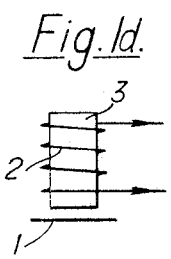
Figure 1E:
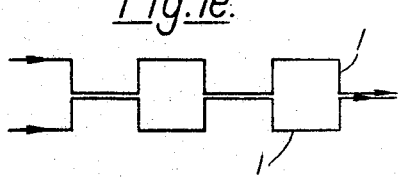
Figure 1F:
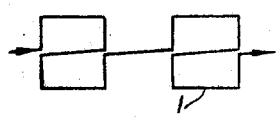
Figure 2A:
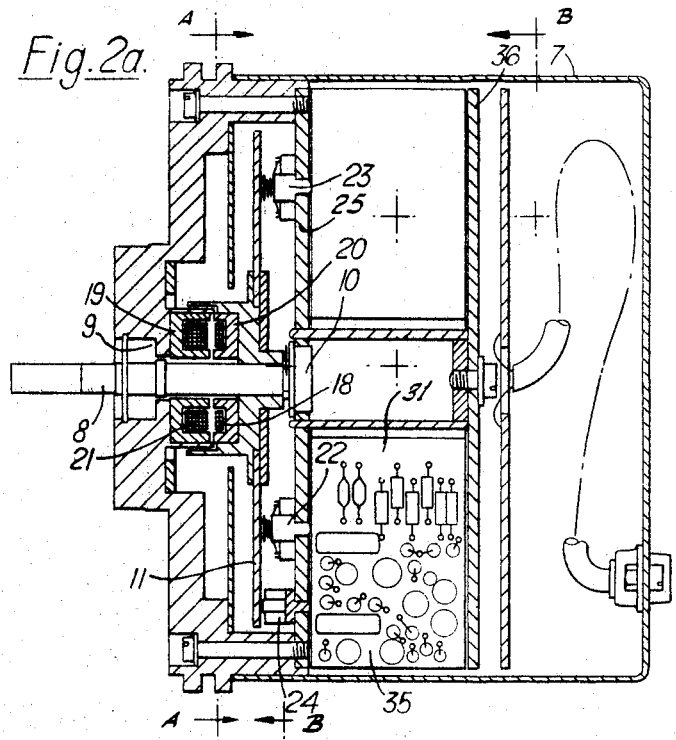
Figure 2B:
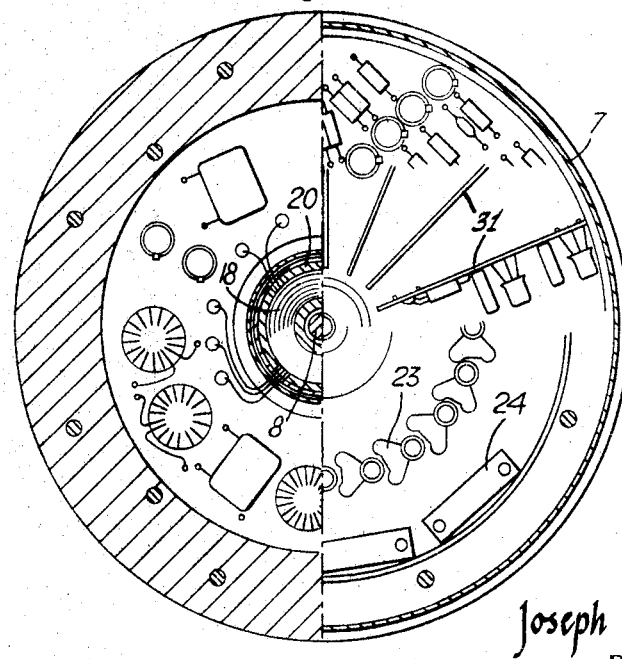
Figure 3:
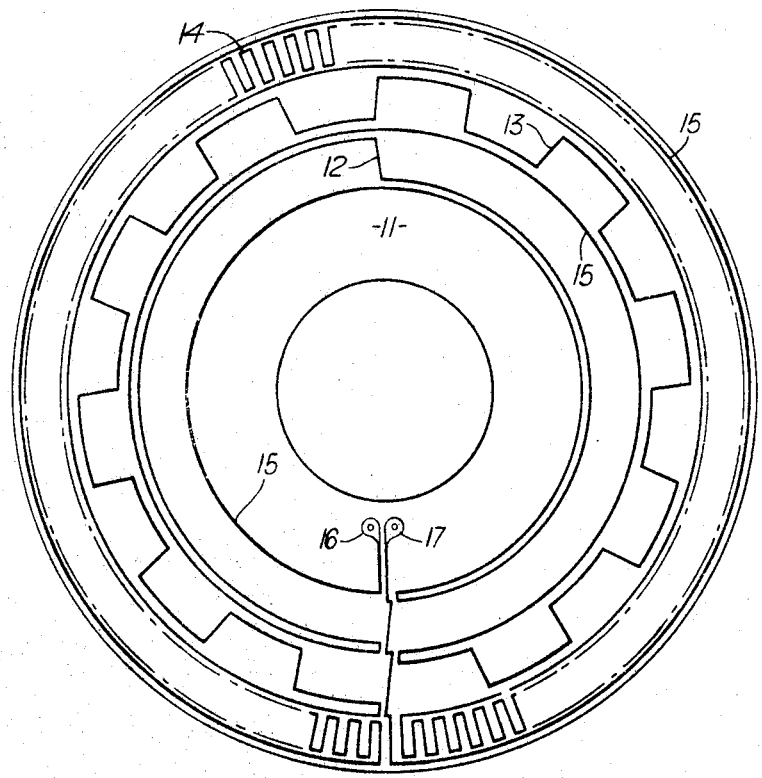
Figure 4A:
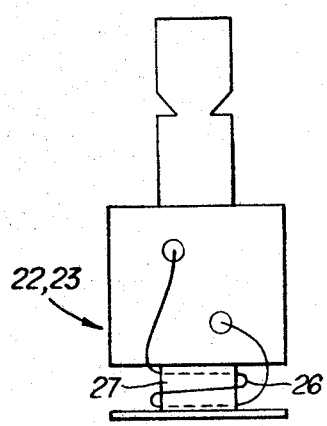
Figure 4B:
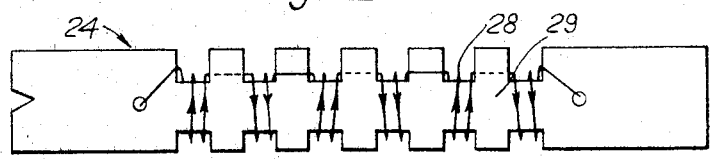
Figure 5A:
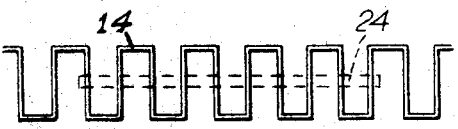
Figure 5B:
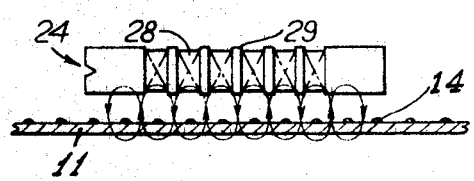
Figure 6:
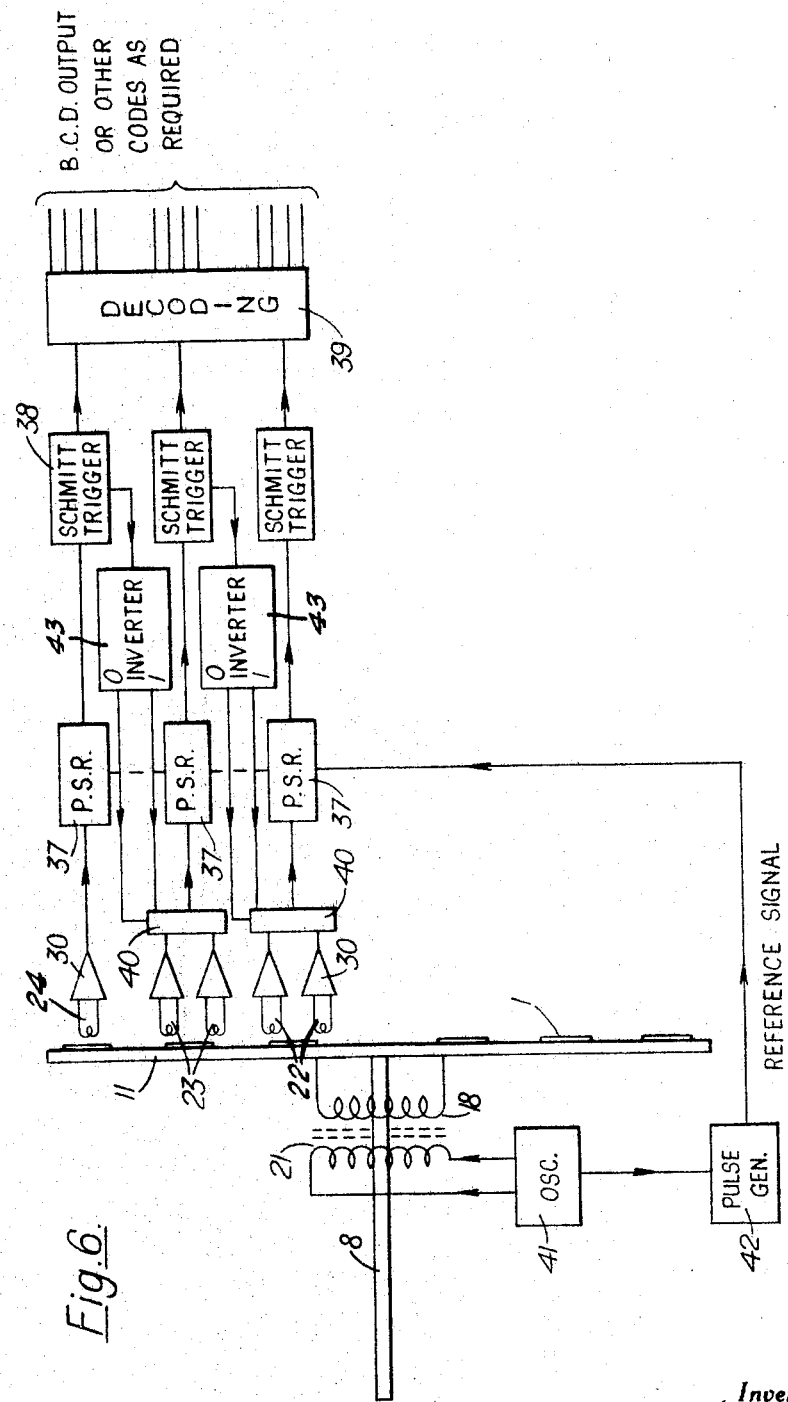

The invention and its subsidiary features will be fully understood from the following more detailed description by way of example of some embodiments thereof, reference being made to the accompanying drawings, in which:

FIGURE 1a is a fragmentary diagrammatic perspective view showing the pattern of a conductor and the arrangement of a cooperating pick-off employed in a binary encoder embodying the invention, FIGURE 1b is a sectional view of the structure shown in FIGURE 1a, FIGURES 1c and 1d are views corresponding to FIGURES 1a and 1b of another embodiment, FIGURES 1e and 1f are representations of other possible conductor patterns, FIGURE 2a is a sectional elevation of a 3-decade 1000-part encoder embodying the invention, FIGURE 2b is a transverse section taken partly on the line A—A and partly on the line B—B of FIGURE 2a, FIGURE 3 is a front elevation of a code disc forming part of the construction shown in FIGURES 2a and 2b, FIGURE 4a is a diagrammatic front elevation of a "coarse" pick-off forming part of the structure shown in FIGURES 2a and 2b, FIGURE 4b is a diagrammatic plan of a "fine" pick-off, FIGURES 5a and 5b are a fragmentary diagrammatic plan and elevation respectively illustrating the operation of the "fine" pick-off shown in FIGURE 4b, and FIGURE 6 is an explanatory schematic diagram of the complete encoder shown in FIGURES 2a and 2b.

FIGURES 1c and 1d illustrate a very simple arrangement according to the invention in which the input member carries a conductor 1 arranged in the form of a square wave extending in the direction of movement of the input member and cooperating with a pick-off coil 2 wound on a ferrite core 3 arranged so that successive waves of the conductor 1 pass across one pole of the pick-off as the input member moves. By feeding a high-frequency alternating current to the conductor 1, an alternating-current voltage is induced in the pick-off coil 2 which is phase-reversed as successive waves of the conductor 1 pass across the pick-off.

In FIGURES 1a and 1b, the pick-off coil is a U-shaped electro-magnet 4 having opposite poles arranged to cooperate with a conductor forming two square waves 5 and 6 which cooperate with the two poles of the pick-off coil. The conductor in FIGURES 1a and 1b is excited with alternating current which flows through the two square waves 5 and 6 in opposite directions as shown so that the effect of the two square waves on the pick-up is additive. FIGURES 1e and 1f show other possible conductor patterns. In all cases, the pick-off coil is provided with a suitable magnetic core to intensify the effect obtained.

The required digital signals can most conveniently be obtained from the pick-off coils by means of phase-sensitive rectifiers, the D.C. outputs of which change between two levels as the input member is moved.

With the arrangement described above, the binary digital signal is obtained from each pick-off coil. By providing a sufficient number of pick-off coils cooperating with conductors having different pitches, any required number of digits can be transmitted.

The invention is not limited to binary encoders, but can be adapted to other number systems, for instance, by providing a number of pick-offs, arranged in successive positions in the path of movement of the input member so that they are energised in cyclic order as the input member moves through the space of one wave-length of the conductor 1. This is illustrated by FIGURES 2a to 6 inclusive of the drawings which show a three-decade 1000-part encoder by way of example.

The encoder shown in these drawings is contained in a casing 7 (FIGURE 2a) from which protrudes an input shaft 8 mounted on ball-bearings 9 and 10 in the casing. The input member in the form of a disc 11 made of electrically insulating material is fixed to the shaft 8 so that it rotates with the shaft. The disc 11 carries a conductor 1 electrolytically deposited on it in the form of three concentric annular code patterns 12, 13 and 14 each of which is virtually surrounded by a single turn 15 serving as an electrical screen. The three patterns and the screening turns 15 are electrically continuous so that they are all connected in series between two terminals 16 and 17 by which an exciting current is fed to the conductor. The innermost pattern 12 is a square wave having a pattern pitch cycle of 360° measured round the axis of the disc. The next annular pattern 13 consists of a square wave having a pitch equal to 1/10 of that of the innermost pattern 12 so that the pitch of the waves in the pattern 13 is equal to 36° measured round the axis of the disc. The outermost pattern 14 has a pitch equal to 1/10 of that of the pattern 13 so that the wave length of the pattern 14 is equal to 3.6° measured round the axis of the disc. Thus the pattern 12 comprises one complete wave cycle, the pattern 13 comprises 10 complete wave cycles and pattern 14 comprises 100 complete wave cycles.

The terminals 16 and 17 are connected to the secondary winding 18 of a transformer having a 2-part annular core of which the part 19 is fixed to the casing 7 whereas the part 20 is fixed to the shaft 8 so as to rotate therewith. The secondary winding 18 of the transformer is located within the core 20 so that it rotates with it, whereas the primary winding 21 is located in the fixed part 19 of the core and can thus be connected to fixed external terminals.

When thus excited by a high-frequency alternating current, the patterns 12, 13, and 14 on the disc 11 cooperate with pick-off devices 22, 23 and 24 supported on a fixed base plate 25 located adjacent the disc 11.

The pick-offs are of two types namely "coarse" types 22 and 23 suitable for wave patterns of relatively coarse pitch and a "fine" type 24 suitable for wave patterns of relatively fine pitch. Each of the coarse pick-offs shown in FIG. 4a consists of a coil 26 wound on a core 27 fixed with its axis at right angles to the surface of the disc 11 so that the alternating current induced in the pick-off coil is phase-reversed as successive sides of the square wave constituted by the pattern 12 or 13 passes across the pole of the coil. As shown in FIG. 4b, each of the fine pick-offs 24 consists of a plurality of coils 28 wound on a core 29 fixed with its axis parallel to the surface of the disc 11 and extending circumferentially in the direction of movement of the pattern 14. The coils 28 are spaced apart end-to-end with alternate coils wound in opposite directions as shown most plainly in FIGURE 4b, the coils being so spaced apart that they are all electromatically coupled to the conductor 14 in the same sense. This can be readily understood from a consideration of FIGURE 5b in which the arrows show the flux path by which the coils 28 are coupled to the square wave pattern conductor 14 for a particular position in the path of movement of the pick-off relatively to the square wave pattern. It will also be appreciated from FIGURE 5b that, as the square wave pattern 14 is moved lengthwise relatively to the pick-off 24 by the rotation of the disc 11, the coupling between the coils 28 and the conductor 14 is first reduced to zero and then restored to a maximum in the opposite sense. Employing a series of coils 28 coupled to different parts of the fine pattern 14 so that they aid one another, as shown in FIGURES 4b and 5b, increases the sensitiveness of the pick-off. It also has the advantage of partially cancelling any errors which may exist in the spacing of the individual waves of the pattern 14 and also tends to eliminate variations due to eccentricity in the pattern.

The output terminals of the pick-offs 22, 23 and 24 are connected to transistorized amplifiers 30 (FIG. 6) mounted on printed circuit boards such as that shown at 31 in FIGURES 2a and 2b arranged radially about the digitizer axis and held in position by a plate 36. The amplifiers 30 are arranged to transmit their output to phase sensitive rectifiers 37 whose outputs are transmitted through Schmitt triggers 38 to a decorder 39 which converts the decimal output obtained from the pick-offs 22, 23 and 24 into a binary coded decimal or other required output.

To obtain a resolution of 1000 parts per revolution of the disc 11, five separate "fine" pick-offs 24 are provided each with its own separate amplifier 30, phase-sensitive rectifier 37 and Schmitt trigger 38. The five separate pick-offs are phase-displaced by $\frac{1}{10}$ cycle so that they operate successively to produce outputs spaced apart by $\frac{1}{10}$ wave length (cycle) of the pattern 14. As each wave cycle in the pattern has two "cross-overs," the five heads will give first five forward signal outputs and then five reversed signal outputs spaced apart from the first five by one half cycle. Ten digital signals are thus interpolated in the space of one wave length of the code pattern 14. The five heads are not crammed into a half-cycle space but are mounted in positions spaced apart by $(N+\frac{1}{10})$ wave length, where N is a convenient integer.

To obtain correspondingly interpolated decimal outputs from the "tens" and "hundreds" code patterns 12 and 13, ten coarse pick-offs 22 and ten coarse pick-offs 23 are provided connected in pairs in a "V-scanning" arrangement designed to overcome ambiguities which can arise when pattern cross-overs occur simultaneously in two or more different denominations. Each pair of pick-offs 22 or 23 is connected to a common phase sensitive rectifier through a switch 40 which selects one or other of the two pick-offs under the control of an inventer 43 according to the value of the next less-significant digit being transmitted.

One member of each pair of pick-offs in this "V-scanning" arrangement is advanced with respect to the position of being encoded and the other pick-off is retarded at equal distance.

In the operation of the encoder shown in FIGURES 2a to 6 inclusive, the movement of the input shaft 8 is transmitted directly to the disc 11 which thus assumes an angular position dependent upon the movement of the member to be encoded. The winding 21 is energized through the high-frequency transformer by an oscillator 41 which also feeds a phase reference signal to a pulse generator 42 which supplies the various phase-sensitive rectifier 37. Each phase-sensitive rectifier thus produces an output which depends on the instantaneous position of the disc 11. The outputs from the five fine pick-offs 24, the ten coarse pick-offs 22 and the ten coarse pick-offs 23 are fed to 25 amplifiers 30 and, after selection by the V-scan arrangement described above, are fed to fifteen phase-sensitive rectifiers 37 each followed by a trigger circuit 38 which squares up the wave form. The fifteen outputs are then taken to the decoder 39 where by suitable recombination of the signals the appropriate outputs are obtained.

What I claim is:

1. An encoder for converting the movement of an input member into a code of digital signals and comprising:
   (a) a rotatable disc,
   (b) a continuous conductor having three wave patterns of one, ten and one hundred cycles, respectively, concentrically arranged on one face of said disc,
   (c) ten detector coils in spaced arrangement along the paths of movement of each of said one and ten wave patterns and with coils associated with each of such patterns paired in V-scan arrangement,
   (d) five detector coils in the path of movement of said one hundred cycle pattern and spaced therealong at intervals of $N+\frac{1}{10}$ wave pitch where N is an integer,
   (e) means for energizing said conductor with high frequency alternating current,
   (f) pluralities of phase sensitive detector for detecting the outputs of said detector coils and producing a predetermined number of pulses for each wave length advance of each wave pattern effected by the rotation of said disc, and
   (g) decoding means connected to the output of said phase sensitive detectors and providing output signals in a desired digital code indicative of the rotational position of said disc.

References Cited

UNITED STATES PATENTS

| | | | |
|---|---|---|---|
| 2,944,157 | 7/1960 | McAuslan et al. | 250—233 |
| 3,143,730 | 8/1964 | McIntyre | 340—347 |
| 3,237,189 | 2/1966 | Wayman | 340—347 |
| 3,286,252 | 11/1966 | Bose et al. | 340—347 |
| 3,371,338 | 2/1968 | Ippolito et al. | 340—347 |
| 2,994,075 | 7/1961 | Abbott | 340—347 |
| 3,241,132 | 3/1966 | Kamski | 340—347 |
| 3,284,795 | 11/1966 | Fertig et al. | 340—347 |
| 3,380,047 | 4/1968 | Gordon | 340—347 |

MAYNARD R. WILBUR, Primary Examiner

J. GLASSMAN, Assistant Examiner